Feb. 23, 1943.　　　G. H. RENNER　　　2,312,287
SAWING ATTACHMENT FOR TRACTORS
Filed Aug. 26, 1940　　　3 Sheets-Sheet 3

Inventor
George H. Renner

By Clarence A. O'Brien

Attorneys

Patented Feb. 23, 1943

2,312,287

UNITED STATES PATENT OFFICE 2,312,287

SAWING ATTACHMENT FOR TRACTORS

George H. Renner, Crofton, Nebr., assignor of one-fourth to Lucille Renner, Crofton, Nebr.

Application August 26, 1940, Serial No. 354,285

1 Claim. (Cl. 143—43)

My invention relates to a sawing attachment for a conventional agricultural tractor operated from the power take-off of the tractor to enable the tractor to be employed as a mobile saw for felling and sawing trees, and the primary object of my invention is to provide a simple, practical, and relatively inexpensive arrangement of this character which can be readily adapted for application to all standard makes of tractors.

Other important objects and advantages of my invention will be apparent from a reading of the following description taken in connection with the appended drawings, wherein for purposes of illustration I have shown a preferred embodiment of my invention.

In the drawings:

Figure 5 is a perspective view of one of the brake shoes.

Figure 6 is a longitudinal vertical sectional view taken through the saw shaft housing.

Figure 1:
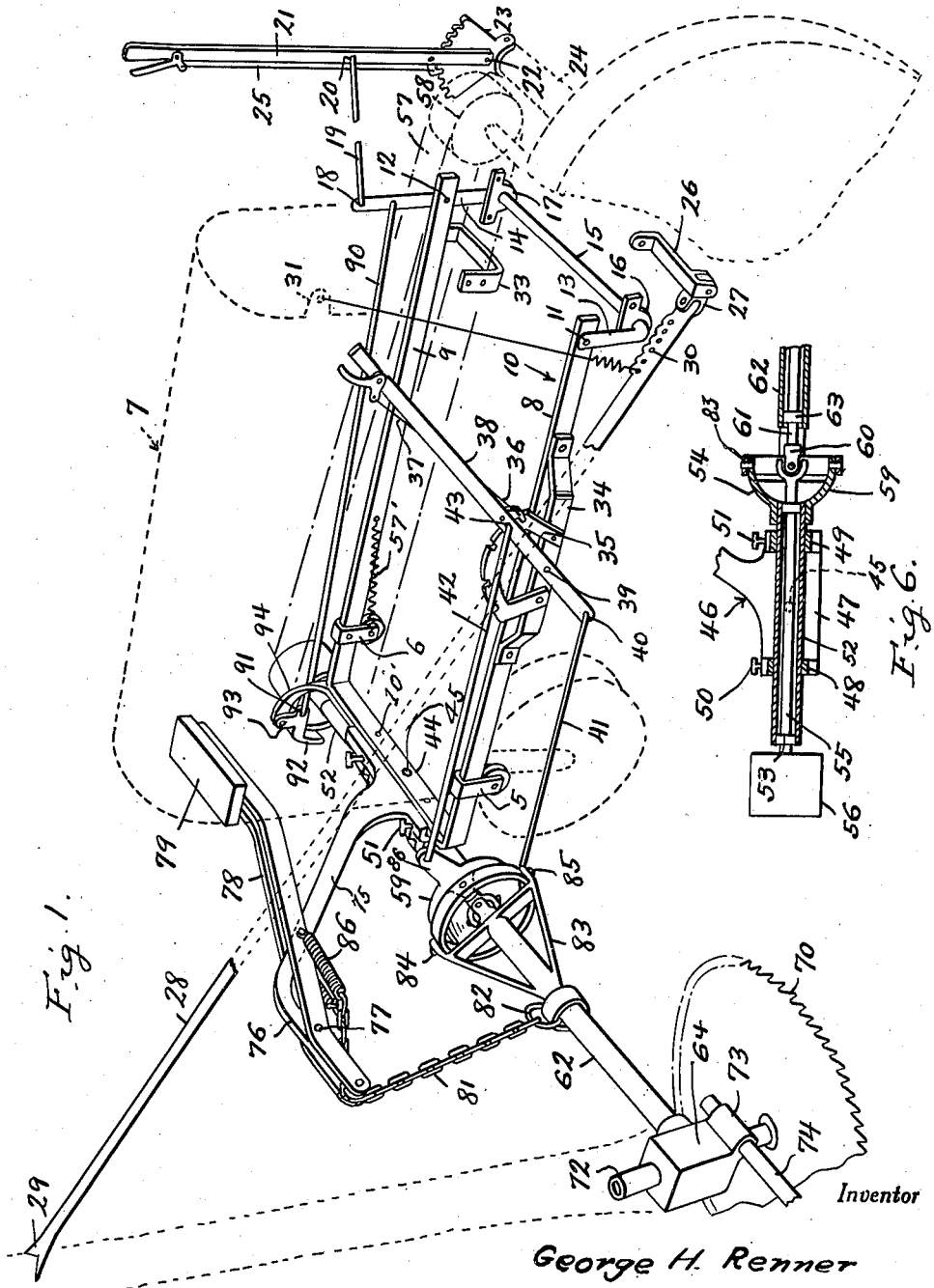
Figure 1 is a general rear perspective schematic view of the attachment showing the same in place on portions of a conventional tractor shown in phantom lines, and showing the rotary saw applied to fell a tree alongside the tractor.

Referring in detail to the drawings, the numerals 5 and 6 refer to roller equipped brackets to be attached to opposite sides of the forepart of the frame of the tractor which is generally designated 7. Through these brackets move the side members 8 and 9 of the U-shaped frame which is generally designated 10. An extra bar backs up the bight portion of the frame 10 and is secured in place by fasteners 10'. The frame has the rear ends of its side members pivoted as indicated at 11 and 12, respectively, to elevated portions of the crank arm 13 and lever 14, respectively, which are secured to opposite ends of the transverse rotary shaft 15. This shaft is journaled in bearings 16, 17, respectively, which are adapted to be bolted to rear portions of the side members of the frame of the tractor. The upper end of the lever 14 has pivoted thereto at 18 the forward end of a link 19 which is pivoted at 20 intermediate the upper and lower ends of a hand lever 21 which is pivoted at 22 on a ratchet gear segment 23 which is mounted on a support portion 24 of the tractor, the said hand lever having a releasable dog 25 operating in connection with the teeth of the segment 23 to releasably hold the lever in adjusted position. Below the shaft 15 is a laterally extending bracket 26 which is attached to a suitable side portion of the tractor and has its outer end provided with a universal connection 27 with the rear end of the tree engaging boom 28. When not in use the boom may be folded alongside the tractor. In use the boom is swung laterally outwardly to engage its forked terminal 29 with the tree at a point above the saw to prevent the tree from falling on the tractor. With the boom engaged with the tree binding of the saw may be eased by shifting the tractor. A helical spring having a choice of connections 30 with the rear part of the boom 28 is stretched between the boom and a bracket 31 on the upper part of the tractor for normally holding the boom in an elevated position. A laterally inwardly extending U-shaped belt guide 33 is attached to the opposite side of the tractor frame 10 laterally outwardly of the side member 9 of the frame 10 for a purpose later described herein.

On the left hand side member 8 of the frame 10 is an outwardly deflected bar 34 on the bight portion of which is mounted a toothed segment 35 for engagement by the dog 36 on the manual release 37 on the hand lever 38. The hand lever 38 is pivoted intermediate its ends at 39 to the bight portion of the bar 34 and has its lower end pivoted at 40 to the rear end of a forwardly extending link 41. Another forwardly extending link or brake rod 42 is pivoted at its rear end at 43 to the hand lever 38 above its pivotal point.

Figure 2:
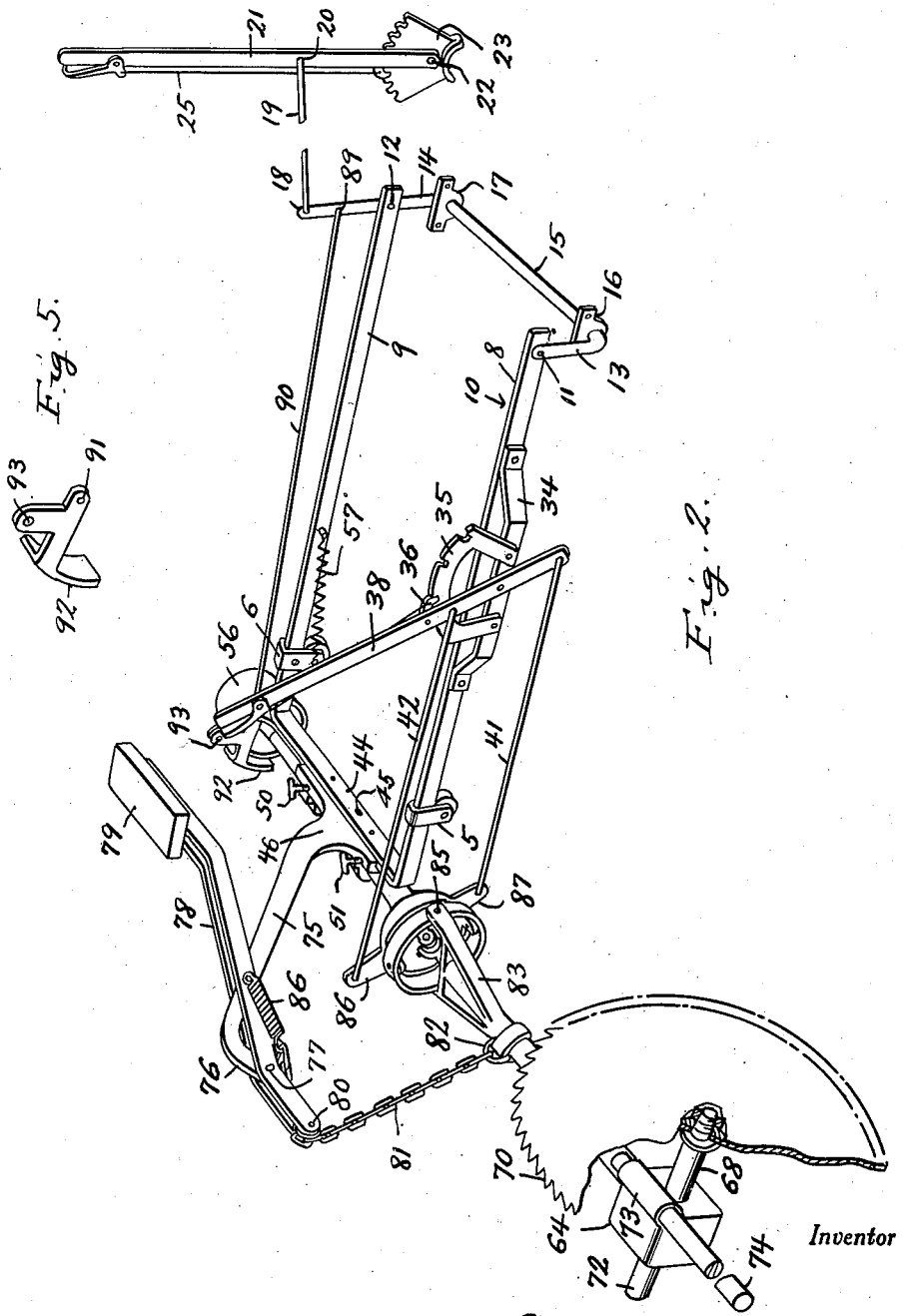
Figure 2 is a view similar to Figure 1 but showing the rotary saw in a vertical plane for log-sawing.
Figures 3, 4:
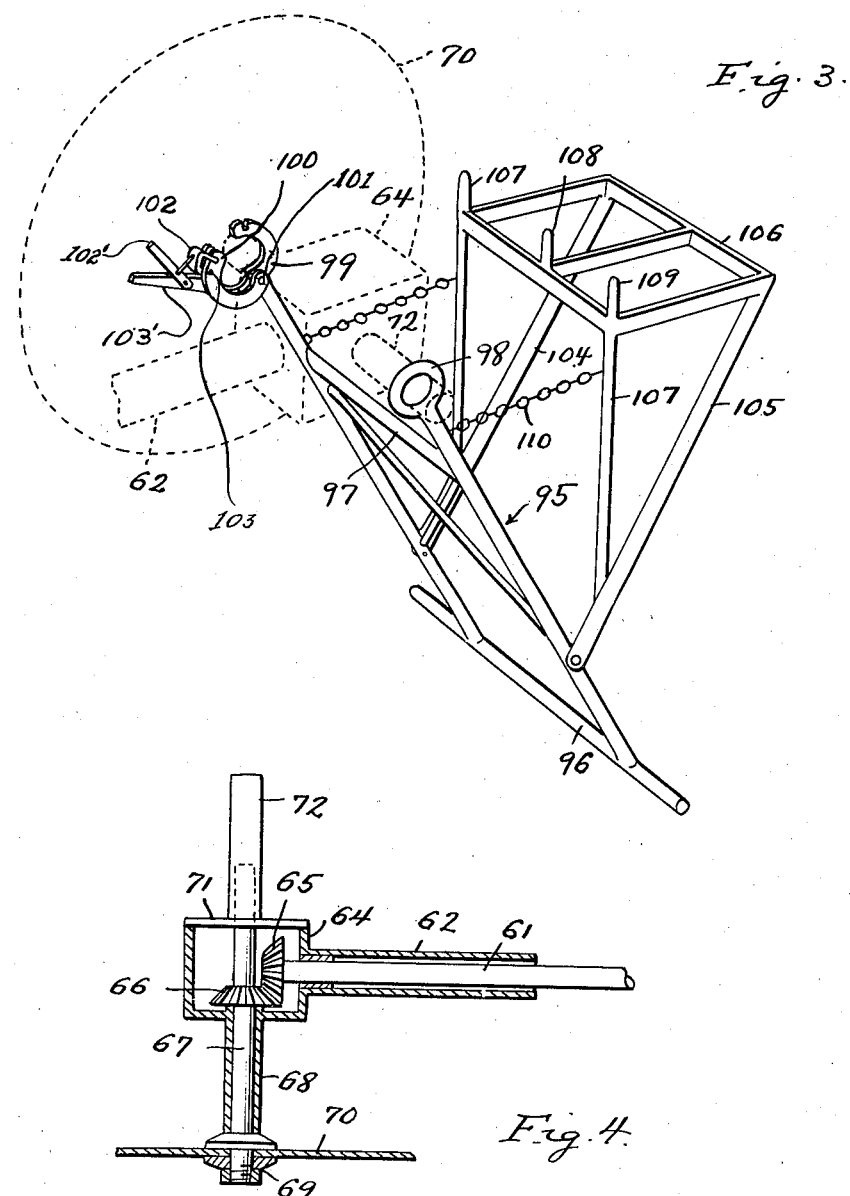
Figure 3 is a perspective view of the log sawing stand showing the same applied to portions of the rotary saw, the latter being shown in phantom lines.
Figure 4 is an enlarged transverse vertical sectional view taken through the rotary saw and its gear case.

In front of the bight portion 44 of the frame 10 is pivoted at 45 the horizontally elongated inverted L-shaped portion of the bracket 46 (Figure 2) with the flange overhanging the said bight portion. Opposite ends of this horizontally elongated portion 47 of the bracket 46 have forwardly extending bearings 48 and 49. A portion 52 of the rotary saw shaft housing turns through the bearings 48 and 49. See Figure 6. Set screws 50 and 51 on the flange of the bracket 46 are adjustable to engage the top of the bight portion of the frame 10 to fix the tilt of the bracket relative to the frame to keep it horizontal. Suitable bearings 53 and 54 in the opposite ends of the housing 52 suitably journal the saw shaft section 55 which has on one end the pulley 56 over which is trained the belt 57 also trained over the belt pulley 58 of the tractor whereby the shaft 55 is driven by the tractor engine. On the left hand end of the housing 52 is mounted a bell-shaped universal joint 59 by which the adjacent end of the shaft housing 62 is swivelly connected to the adjacent end of the shaft housing 52. The shaft section 61 is mounted in the tubular housing 62 in suitable bearings 63 and is connected at its inner end by the universal joint 60 with the adjacent end of the shaft section 55. By means of the described arrangements the housing 62, and consequently the saw, is capable of being raised or lowered and rotated on the axis of the housing 52. The housing 62 is rotated by adjusting the position of the lever 38. The outer end of the shaft 61 has fixed thereto a beveled pinion 65 (Figure 4) which is in mesh with a beveled pinion 66 which is fixed on the saw mandrel shaft 67 which runs in the tubular extension 68 of the gear case 64 and has detachably connected as indicated by the numeral 69 to its outer end the circular saw 70. The mandrel shaft 67 extends across the gear case 64 and is journaled in the tubular extension 72 as shown in Figure 4 of the drawings. A closure plate 71 on the open end of the gear case has attached thereto the extension 72. The gear case has a lateral extension 73 having a bore to receive a handle 74 to enable the operator of the device to guide the saw with respect to the work. See Figures 1 and 2. The extension 72 is particularly adapted to make connection with the sawing stand to be described and which is shown in Figure 3 of the drawings.

The bracket 46 has an upwardly and laterally outwardly extending arm 75 which terminates in a downwardly directed hooked portion 76 which has pivoted to opposite sides thereof at 77 the double bar lever 78 which has a weight 79 at one end and has a roller 80 at its opposite end over which is trained a chain or cable 81 which has its lower end connected to a slidable sleeve 82 on the saw shaft housing section 62 immediately to the left of the yoke portion 83 of the universal joint 59. The chain 81 extends between the bars of the lever 78 and is connected to the ends of two coiled springs 86 which have their opposite ends connected to the outer sides of the bars of the lever 78. The weight 79 balances the saw assembly so that the assembly is easily applied to the work by pushing on the handle 74. When the handle is released the saw assembly is returned by the weight 79 to its initial freely suspended position. The springs 86 allow the saw to be moved lower than the chain alone would permit.

It will be noted in connection with the universal joint 59 that the yoke 83 is pivoted to the other element of the joint at the diametrically opposite outside points 84 and 85. The housing 59 has diametrically opposed arms 86 and 87 (Figure 2) to which the upper and lower rods 42 and 41, respectively, are pivotally connected in such a way that the movement of the lever 38 permits positioning the saw 70 in different horizontal and vertical planes.

The lever 14 has pivoted at 89 intermediate the points 18 and 12 the rear end of the brake operating rod 90 which has its forward end connected at 91 to the arcuate brake shoe 92 which has an upwardly projecting arm pivoted at 93 to a laterally and forwardly extending bracket 94 attached to the bight of the frame 10. See Figure 1. The cover portion of the brake shoe overhangs the pulley 56 on the saw driving shaft so that when the lever 21 is pulled rearwardly from the position shown in Figures 1 and 2, the brake shoe 92 will be applied to the pulley to arrest rotation of the saw driving shaft. At the same time, through the agency of the lever 14 the frame 10 is moved rearwardly on the rollers of the brackets 5 and 6 along the top of the tractor frame, so as to stretch spring 57' and make the saw drive shaft pulley 56 approach the power take-off pulley 58 of the tractor and thereby slacken up on the driving belt 57, thereby producing substantially the same effect as a declutching of a clutch mechanism, while saving the trouble and expense involved in providing and maintaining such a clutch structure. To tighten the belt and reestablish its driving engagement with the pulley 56, the lever 21 is moved forwardly again. The gear case 64 is made as light weight as possible consistent with required strength.

Referring now to Figure 3 of the drawings, showing the saw stand, the numeral 95 generally designates an open frame consisting of side members connected to a transverse ground engaging member 96 and having extending therebetween a cross brace 97 below the upper ends thereof. The upper end of one of the side members is looped as indicated by the numeral 98 to snugly receive the extension 72 on the saw gear case 64 while the upper end of the remaining side member is provided with a clamp consisting of a stationary jaw 99 and an outwardly swingable dual jaw 100 pivoted to the lower end of the jaw 99 at opposite sides thereof as indicated by the numeral 101. A suitable detent 102 is pivoted between the swingable jaw sections at 103 to enter notches in the jaws to lock the jaws closed around the saw shaft housing section 62, whereby the stand is properly mounted to rest on the ground and hold the saw mechanism sufficiently rigidly in place. A lever 102' is pivoted on an extension 103' on the swingable jaw and is linked to the detent 102 for moving the detent into and out of the notches in the jaws. Pivoted intermediate the upper and lower ends of the side members of the frame 95 are side members 104 and 105 whose upper ends are connected to the corners of an open work rectangular horizontal frame 106 whose remaining corners are connected by angulated braces 107 to the side members 104 and 105. Fingers 107, 108, and 109 may be distributed along the frame 106 to enable properly positioning the logs or the like which are rested on the frame 106 for cutting by the saw lengthwise or crosswise as may be desired. Cables 110 extend between the side members of the ground engaging frame 95 and the braces 107 of the lumber support to permit the latter to swing away from the frame 95 in the position shown in Figure 3 of the drawings.

Although I have shown and described herein a preferred embodiment of my invention, it is to be definitely understood that I no not desire to limit the application of my invention thereto, except as may be required by the scope of the subjoined claim.

Having described the invention, what is claimed is:

A sawing attachment for a tractor, said tractor including a frame, support members, and a power take-off including a pulley; said sawing attachment comprising a forwardly and rearwardly movable framef having portions resting on the tractor frame, crank means connecting the rear ends of said movable frame, said crank means being connected to the tractor frame for moving said movable frame, a lever including detent means mounted on one of said support members and having operating connections with the crank means for shifting and holding said movable frame, a rotary saw driving shaft, a housing mounting said driving shaft on the forward part of said movable frame and having a pulley aligned with said power take-off pulley, a belt trained over said pulleys, said lever being operable to shift said movable frame to slacken or tighten said belt on said pulleys, a brake shoe for said last-named pulley, and a brake shoe-operating rod connected to said crank means for simultaneous actuation of the brake shoe with the movement of the frame.

GEORGE H. RENNER.